United States Patent [19]

Ueno et al.

[11] 4,309,376

[45] Jan. 5, 1982

[54] METHOD FOR PRODUCING A SHOE SOLE

[75] Inventors: Yoshio Ueno, Kobe; Masanobu Inohara, Akashi, both of Japan

[73] Assignee: Asics Corporation, Kobe, Japan

[21] Appl. No.: 54,853

[22] Filed: Jul. 5, 1979

Related U.S. Application Data

[62] Division of Ser. No. 913,757, Jun. 8, 1978.

[30] Foreign Application Priority Data

Dec. 13, 1977 [JP] Japan .................................. 52-49299
Jan. 25, 1978 [JP] Japan .................................. 53-6519

[51] Int. Cl.³ ............................ B29H 7/08; B29C 1/00
[52] U.S. Cl. .................................. 264/241; 36/32 R;
264/77; 264/244; 264/247; 425/129 S; 425/403
[58] Field of Search ............... 264/244, 245, 246, 247,
264/241, 77; 425/119, 129 S, 403; 36/32 R

[56] References Cited

U.S. PATENT DOCUMENTS

| D. 240,340 | 6/1976 | Asken | D2/320 |
| 2,651,118 | 9/1953 | Root | 36/32 R |
| 3,051,994 | 9/1962 | Carozzo | 264/245 |
| 3,165,841 | 1/1965 | Rollman | 36/30 R |
| 3,327,334 | 6/1967 | Wilmanns et al. | 36/32 R |

FOREIGN PATENT DOCUMENTS 2048115  3/1971  France .......................... 425/129 S Primary Examiner—James B. Lowe

[57] ABSTRACT

A method for producing a shoe sole, which comprises forming in a bottom surface of a cavity of an outer mold of the sole forming mold a groove for forming a ridge which is to divide said bottom surface into at least two sections, charging a sole forming materials into said cavity such that respective materials will be supplied into the adjoining two sections, closing the cavity with the press plate of said mold, and then compressing and heating the cavity.

1 Claim, 8 Drawing Figures

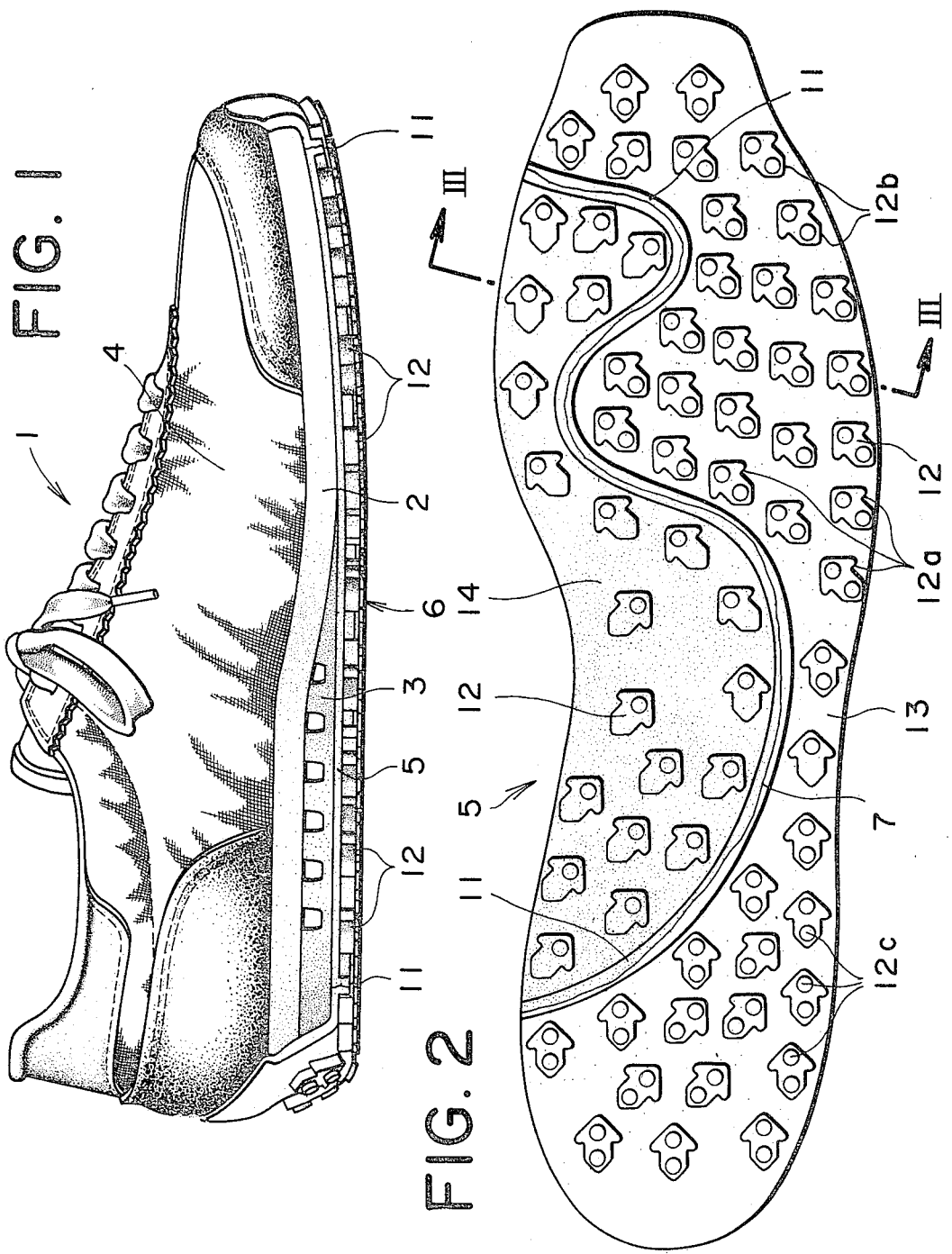

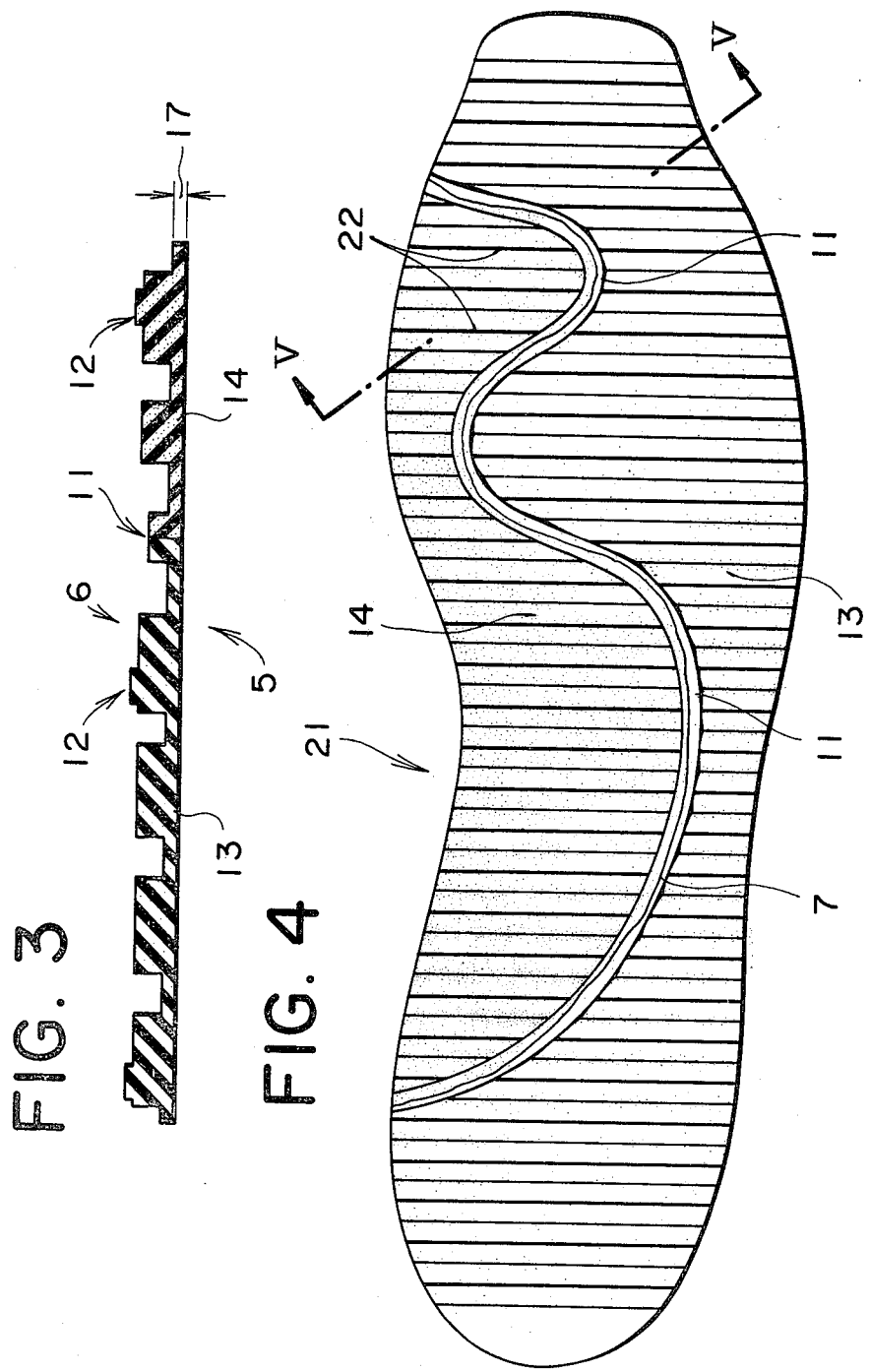

METHOD FOR PRODUCING A SHOE SOLE

This application is a divisional application of the copending U.S. patent application Ser. No. 913,757 filed June 8, 1978 Pending Group 350.

This invention relates to a method for producing a shoe sole, which comprises forming in the bottom surface of a cavity of an outer mold of the sole forming mold a groove for forming a ridge which is to divide said bottom surface into at least two sections, charging sole forming materials into the cavity such that respective materials will be supplied into the adjoining two sections, closing the cavity with the press plate of said mold, and then compressing and heating the cavity.

There is known a so-called two-tone color shoe sole. The ground-contacting surface of such shoe sole is sectioned with different colors to produce a design effect. Such two-tone color sole is molded by charging the materials with different colors simultaneously into the cavity of a closed mold and compressing the materials with a press plate while heating the mold. During molding of such shoe sole, the flowing direction of the materials in the mold cannot be controlled, so that the materials could be jumbled together around the boundary to make it hard to obtain a desired demarcation line or lines that give a distinct color division. Consequently, the obtained shoe sole has only poor decorative design effect and hence is low in commercial value.

Therefore, there has been generally employed a method in which a ridge (or ridges) is formed at that part (or parts) of the cavity of said mold which corresponds to the color demarcation line (or lines) on the shoe sole and, after feeding the materials with different colors into the respective sections divided by said ridge(s), said materials are subjected to molding under heating. However, in the shoe sole formed by such conventional method, particularly in case the sole is small in thickness, the color demarcation line portion of the sole formed by the presence of the ridge is recessed and becomes even smaller in thickness, so that a fissure or rip may develop from such recessed thin portion in use. If the height of the ridge is decreased so as to prevent such break of the shoe sole, it becomes difficult to form a clear color demarcation line.

These problems also arise when the shoe sole is formed by using the materials of different types or qualities instead of the materials with different colors. It suggests itself as a good measure to use a rubber material with high wear resistance at the part of the shoe sole where a high foot force is applied, while using a rubber material with relatively low wear resistance at the non-stepped portion where not much foot force is exerted. In this case, both materials are heated and fused together during molding, and when the material boundary portion is recessed as in the above-said case, such portion may rip because of small thickness, and also a crack or fissure may develop in the fused area as such area is narrow.

Another important object of this invention is to provide a method of molding a shoe sole by using a concave mold (female mold) having a recessed groove or furrow at the position corresponding to the material boundary portion of the sole, wherein two or more different types of materials are charged into said mold and heated and pressed therein so that the materials on both sides of said recessed groove will be forced into said groove simultaneously, while controlling such flow of the materials by the wall surface of said groove so that each material won't mix into the sphere of the other material.

Thus, according to the present invention which has the above-said objects, there is provided a shoe sole which is formed on its ground-contacting surface with a strip or strips of protuberant wall that divides said ground-contacting surface into at least two sections, with one section of the adjoining two sections being constituted from different sole material from the other section.

The other objects and advantages of the present invention will become apparent from the following detailed description and accompanying drawings, in which:

FIG. 1 is a side view of a sports shoe adapted with the sole of the present invention;

FIG. 2 is a bottom view showing an embodiment of the shoe sole according to the present invention;

FIG. 3 is a sectional view taken along the line III—III of FIG. 2;

FIG. 4 is a bottom view showing another embodiment of the shoe sole according to this invention;

Figure 6A:
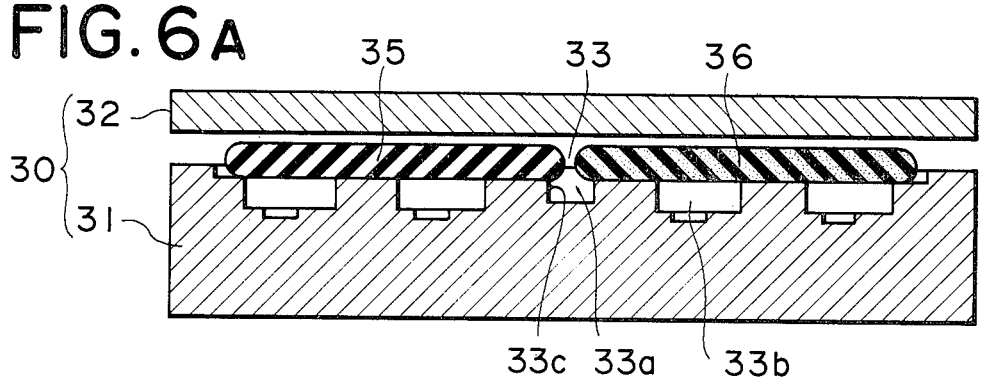
Figure 6B:
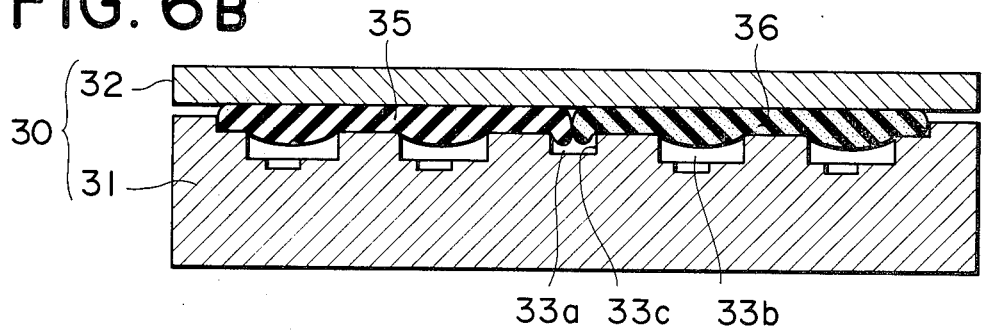
Figure 6C:
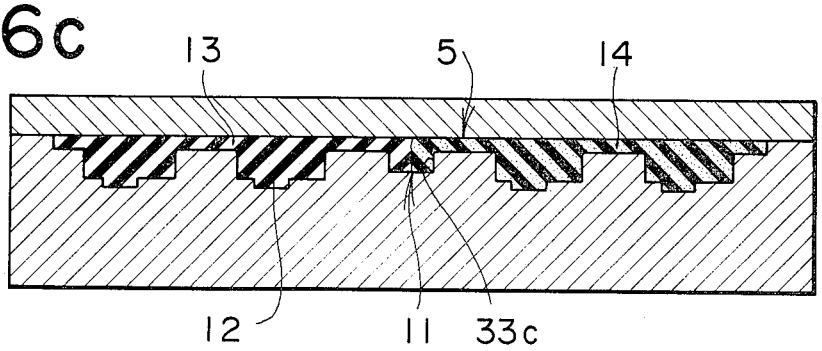

FIG. 6 shows a process for producing a shoe sole in accordance with this invention, wherein FIG. 6A is a sectional illustration showing a condition where two different kinds of material were charged into the mold, FIG. 6B is a sectional illustration showing a condition in the course of heating and pressing, and FIG. 6C is a sectional illustration of a condition where the molding of a shoe sole has been just completed.

Referring to FIG. 1, there is shown a sports shoe comprising an insole 2 joined to the underside of the instep 4, an elastic intermediate member 3 jointed to the heel portion on the underside of the insole 2, and an outsole (ground-contacting bottom sole) joined to the underside of the intermediate member 3 and the underside of the front portion of the insole 2. The term "shoe sole" is used in this invention to refer to said outsole 5. There is available a shoe sole of the type formed by integrally molding said insole 2, intermediate 3 and outsole 5. The shoe sole of this invention includes such type and is intended to mean any member which substantially forms a ground-contacting surface 6.

On the bottom surface of the outsole 5, that is, on the ground-contacting surface 6 of the shoe sole are formed a strip of protuberant wall or ridge 11 and a plurality of creeper protuberances 12 as apparent from FIGS. 1 to 3. Said ridge 11 is positioned on the boundary line 7 which divides the outsole 5 into a first section 13 and a second section 14 which are made from the different materials (the materials of different qualities or different colors).

Said shoe sole 5 may be made of any suitable material such as natural rubber, synthetic rubber or a thermoplastic resin which forms a rubber-like elastic body, and these materials may be used either singly or in combination. In case of differentiating the first section 13 and the second section 14 by color, said both sections may be same quality or different quality from each other. In case of forming said both sections from different materials, it is recommended to use a material with high wear resistance for the first section where a great amount of foot force is applied to cause an excessive degree of wear, while using a highly elastic material or an inexpensive material for the second section where not much foot force is exerted.

Said ridge 11 is formed along the boundary between the first and second sections. If the boundary line 7 demarcates the part where the foot force is applied strongly and the part where not much foot force is exerted as shown in FIG. 2, said ridge proves particularly useful in case the shoe sole is formed from different materials as said before. Said ridge or protuberant wall 11 is lower than the creeper protuberances 12, but since the thickness of this wall portion is greater than that (17) of other parts of the shoe sole, there is provided a wider area of fusion of both materials, and hence there is little possibility that a crack or rip should develop from the fused portion in use. Also, the ridge 11, when curved as shown in FIG. 2, takes a slip-preventive effect.

As described above, it is possible with this invention to produce a shoe sole with excellent decorative effect by using the materials of different colors, or a shoe sole with functional and economical advantages and improved wear resistance particularly at the part where strong foot force is exerted, by using the materials of different qualities.

It is possible to form the shoe sole by using three or more different kinds of materials by forming a corresponding number of strips of or branched ridges 11.

In the embodiment shown in FIG. 2, said creeper protuberances 12 are of sagittal form and one or two round lobes 12c are formed on the surface of each of said protuberances 12. As shown in FIG. 2, the directions of the respective sagittal protuberances are decided in conformity to the manner in which the ground-contacting surface 6 of the shoe sole comes into contact with the ground. The ground-contacting area transfers successively forwardly from the heel, so the sagittal protuberances are formed in the direction of such transfer. According to this arrangement, the bent-in portions 12a and rear end portions 12b of the sagittal protuberances 12 produce a greater effect of preventing slip on the ground surface to improve the antislip effect of the shoe sole.

Figure 5:
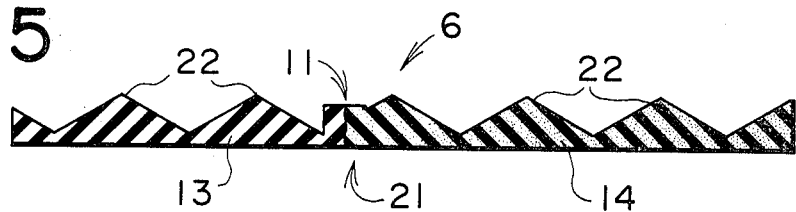
FIG. 5 is a sectional view taken along the line V—V of FIG. 4.

Referring now to FIGS. 4 and 5, there is shown another embodiment of the shoe sole according to this invention. The shoe sole 21 of this embodiment differs from that of the embodiment of FIGS. 1 to 3 only in the configuration of the creeper protuberances and is same as the foregoing embodiment in that the sole is formed from the first section 13 and second section 14 and is provided with a ridge 11 which demarcates said both sections. On the bottom surface of the shoe sole 21 are formed the serrate or jagged protuberances 22. It will be noted that various shapes of creeper protuberances may be provided even when a strip or strips of demarcating wall or ridge is formed on the shoe sole.

Now the method of producing the above-said shoe sole of this invention is described with reference to FIGS. 6A to 6C.

The mold 30 consists of a female mold 31 and a press plate 32. The female mold 31 is formed with a cavity 33 while the press plate 32 is formed from a single piece of flat plate. Said cavity 33 includes a groove 33a for forming the protuberant wall or ridge and a plurality of recessions 33b for forming the creeper protuberances.

Reference numerals 35 and 36 indicate the materials for forming the first section 13 and second section 14, respectively. Preferably, these materials 35, 36 are previously formed into a configuration similar in plane surface to said first and second section 13, 14 to be formed.

First, said materials 35, 36 are charged into the cavity 33 of said female mold 31 and the press plate 32 is placed thereover (FIG. 6A). Then the mold 30 is heated to a suitable temperature and the press plate 32 is forcedly moved in the direction of the mold 31. The suitably heated and compressed materials flow in the cavity 33 and get into the groove 33a and recessions 33b (FIG. 6B).

The materials 35, 36 existing around the boundary are forced into the groove 33a as shown in FIG. 6B. In this case, the forced-in materials are controlled in their direction of flow by the wall surfaces 33c, 33c of the groove 33a so that one material won't get into the area of the other material. Both materials which have filled the groove 33a in the said way are fused to each other in the groove 33a, thereby forming the ridge 11 which demarcates the two sections. Thus, each material is forced into the groove before any one material fills the groove, and thereby a demarcation line (fused plane) is formed positively in the groove portion.

In this way, said both materials 35, 36 fill the cavity 33 including the groove 33a and recessions 33b to form the first section 13 and the second section 14, respectively, to thereby produce a shoe sole of a desired configuration (FIG. 6C).

As described above, according to the method of this invention, the materials 35, 36 which are in flux under heating and pressure move toward each other and toward groove 33a positioned therebetween, and after impinging against each other or slightly before such impingement, they flow down into and fill the groove 33a since such groove is formed just at the position where said impingement takes place. Since the thus forced-in materials are checked by the wall surfaces 33c of the groove 33a, they fuse with each other in the groove 33a without getting jumbled and one protuberant wall or ridge is formed. Even if both materials have a difference in the distance of movement from the outer periphery to the boundary line, both materials positively flow into the groove 33a before said groove is filled up by any one of the materials, so that the fused plane of both materials is securely and correctly positioned in the groove, allowing production of a shoe sole with a wide fused area.

What is claimed is:

1. A method for producing a shoe sole having a ground-contacting surface having at least one strip of a protuberant wall or ridge which demarcates said ground-contacting surface into at least two sections, said ground-contacting surface also having a plurality of creeper protuberances, the material of one section of said adjoining two sections being different from the material of the other section, comprising the steps of:
   (a) charging materials into the cavity of the outer mold of a sole forming mold, said cavity including in the bottom surface at least one groove for forming at least one strip of protuberant wall or ridge and a plurality of recessions for forming said creeper protuberances, said materials being previously shaped into configurations similar to said sections of shoe sole to fuse said materials together in said groove of cavity,
   (b) closing said cavity with a press plate of the sole forming mold, and
   (c) compressing and heating said cavity to form a shoe sole.

* * * * *